United States Patent [19]

Orkin

[11] Patent Number: 5,137,374
[45] Date of Patent: Aug. 11, 1992

[54] TITANIUM BEARING SURFACE

[75] Inventor: Stanley S. Orkin, Vernon, Conn.

[73] Assignee: Kamatics Corporation, Bloomfield, Conn.

[21] Appl. No.: 565,446

[22] Filed: Aug. 10, 1990

Related U.S. Application Data

[63] Continuation-in-part of Ser. No. 285,601, Dec. 16, 1988, which is a continuation of Ser. No. 77,395, Jul. 24, 1987, Pat. No. 4,842,424, which is a continuation-in-part of Ser. No. 567,612, Jan. 3, 1984, Pat. No. 4,717,268, which is a continuation of Ser. No. 255,634, Apr. 20, 1981, abandoned.

[51] Int. Cl.$^5$ ............................................. F16C 33/04
[52] U.S. Cl. ..................................... 384/298; 384/297; 384/912
[58] Field of Search .............. 384/203, 912, 206, 213, 384/909, 908, 299, 300, 298, 297

[56] References Cited

U.S. PATENT DOCUMENTS

| | | | |
|---|---|---|---|
| 3,724,919 | 4/1973 | Lagally et al. | 384/912 |
| 4,666,787 | 5/1987 | Bickle et al. | 384/912 |
| 4,842,424 | 6/1989 | Narkon et al. | 384/203 |

FOREIGN PATENT DOCUMENTS

| | | |
|---|---|---|
| 916738 | 6/1938 | Fed. Rep. of Germany . |
| 25667 | 3/1973 | Japan . |
| 1101995 | 2/1968 | United Kingdom . |

*Primary Examiner*—Lenard A. Footland
*Attorney, Agent, or Firm*—Cushman, Darby & Cushman

[57] ABSTRACT

A bearing assembly comprises coengaging inner race and outer race members movable relative to one another. The inner race has an outer bearing surface to which is fixedly secured a self-lubricating bearing material which engages and is movable relative to the bearing surface of the outer race member. The outer race is case hardened titanium.

18 Claims, 2 Drawing Sheets

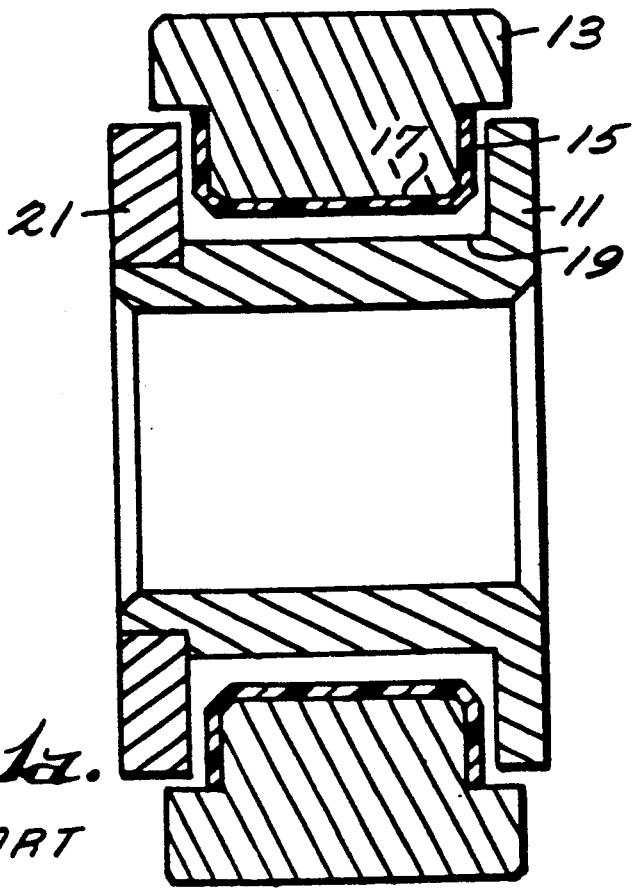
Fig. 1a.
PRIOR ART
Fig. 1b.
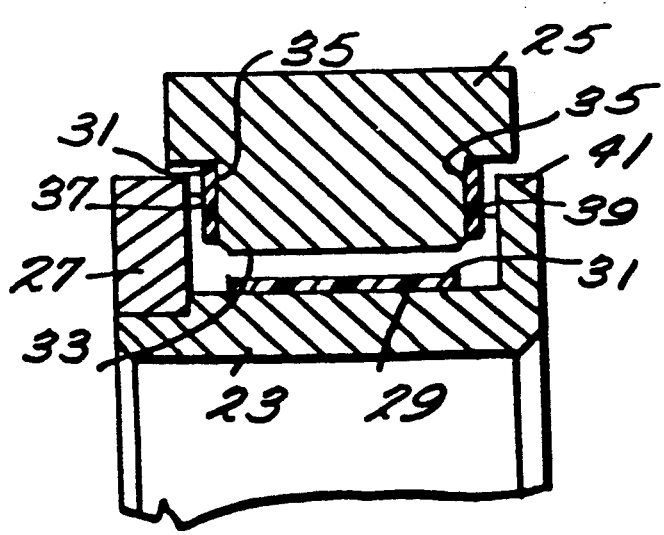

TITANIUM BEARING SURFACE

This is a continuation-in-part of application Ser. No. 285,601 filed Dec. 16, 1988 which is a continuation application Ser. No. 077,395 filed Jul. 24, 1987, now U.S. Pat. No. 4,842,424, which is a continuation-in-part of application Ser. No. 567,612 filed Jan. 3, 1984, now U.S. Pat. No. 4,717,268, which is a continuation of application Ser. No. 255,634 filed Apr. 20, 1981, abandoned.

BACKGROUND AND SUMMARY OF THE INVENTION

The present invention relates to a bearing assembly and particularly to a self-lubricating bearing assembly which provides greater operational life than is presently available.

More particularly, the present invention relates to a bearing assembly comprising co-engaging inner race and outer race members movable relative to one another wherein the inner race has a bearing surface provided with a self-lubricating bearing material which is engageable with and movable relative to the bearing surface of the outer race. The races are made from a metal and titanium is preferred.

Conventional track roller bearings are constructed of rolling elements positioned between inner and outer races, lubricated by grease. Periodic lubrication is required to maintain operational performance with added resistance to corrosion. Such bearings are subject to failure where fracturing of the rolling elements and spalling of the inner race occur. The performance of these known track roller bearings also depends on the effectiveness of the seals associated therewith which not only insures that the grease lubrication is maintained within the bearing proper but also that contamination from external sources is avoided.

A bearing assembly which is an alternate to the above-described rolling element—track roller assembly is known, this alternate incorporating a self-lubricating liner system affixed to the inner surface of an outer race which operates against the bearing surface of a hardened inner race. These bearing assemblies do not require periodic lubrication and they generally have higher rolling load capacity than the aforementioned rolling element-track roller bearings. Also, the static radial load capacity of these alternate bearing assemblies is substantially higher than the rolling element type bearings with high thrust capacity being ensured by the use of the separate self-lubricating liner system. Such an alternate self-lubricating type bearing assembly is disclosed for instance in U.S. Pat. Nos. 4,048,370 and 4,134,842.

It has been found, however, that the lubricating material fixed to the outer race in track-roller bearing assemblies is subject to distortion and consequent reduced service life relative to the claimed arrangement due to induced liner deflection when loaded by the inner race during rotation of the outer race. This condition adversely affects the bond between the lubricating material and the outer race, and as the bond fails, the lubricating material is pinched between the inner and outer races without any support and tends to be squeezed out.

Known track-rollers are constructed utilizing a self-lubricating liner system attached to the inside diameter of the outer race with the belief that the wear experienced during the life of the bearing system would be distributed over the full circumference of the liner system and thus result in extended service life expectancy. However, it has been observed that due to the rotation of the outer race self-lubricating liner in relation to the stationary inner race and the unidirectional load application, liner systems with compression modulus up to about 1,000,000 psi are subjected to material deflection. The mismatch of the inner race circumferential surface to the outer race by differential tolerances and the thickness of the liner system provide the mechanism which permits local deflection of the liner system as the outer race translates to the stationary inner race when loaded. Therefore, liner systems when reacted with a steady applied load, while moving in relation to the inner race, impose high shearing action and tensile forces on the liner immediately in front of the progressing load action of the inner race, which is known as ploughing. When combined with fluid contamination, the liner system is further distressed due to the wedging action of the fluid in front of the advancing inner race slider.

It has now been found that the bearing assembly of the present invention avoids this liner bond failure occasioned by the above described ploughing action and exhibits a significantly extended wear life. In the bearing assembly of the present invention the self-lubricating bearing material is provided on the outer bearing surface of the inner race member rather than, as in prior art bearings, on the inner bearing surface of the outer race. This construction ensures positive contact between liner system and mating surface, so that fluid contamination does not become a mechanical wedging tool as it does in known self-lubricating track rollers. The present invention precludes the deflection of the liner system which creates a shear lip thereby causing high shearing forces within the liner. The liner system adhered to the outside diameter of the inner race does not permit hydraulic wedging due to fluid contamination. The limited wear surface of this configuration allows a number of additional wear surfaces which can be positioned by reindexinq the inner race in relation to the primary load application. Thus, the bearing assembly of the present invention comprises an inner race member the outer surface of which constitutes a bearing surface provided with a self-lubricating bearing material, and an outer race member having an inner bearing surface coengaging and movable relative to the self-lubricating bearing material fixedly secured to the outer bearing surface of said inner race.

The drawings show a preferred embodiment of the invention but it will be understood that various changes may be made from the construction disclosed and that the drawings and description are not to be construed as defining or limiting the scope of the invention.

BRIEF DESCRIPTION OF THE DRAWINGS

FIG. 1a is an exploded view in section of a prior art bearing;

FIG. 1b is a fragmentary sectional view of the bearing;

DETAILED DESCRIPTION OF THE INVENTION

Figure 2:
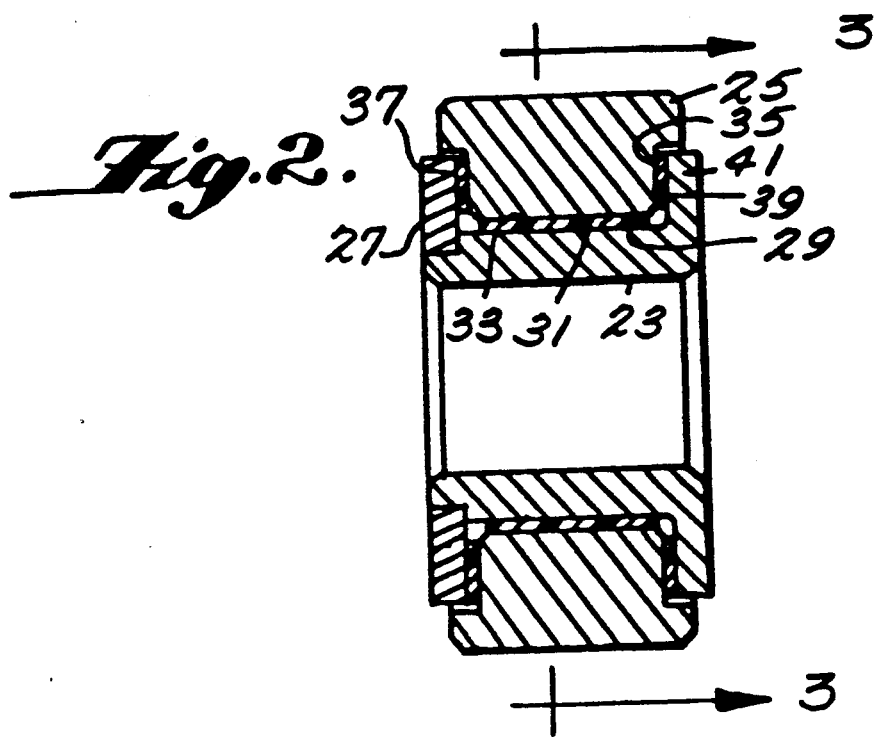
FIG. 2 is a sectional view of the bearing of this invention.

FIG. 1a is a sectional view, slightly separated to more clearly illustrate details of the self-lubricating material, employed therewith of a prior art bearing assembly such as disclosed in U.S. Pat. No. 4,134,842 to Orkin et al. The bearing assembly includes an inner race 11 which may, for example, be a bushing which is mechanically locked in place. An outer race 13 is so positioned that it is engageable with the inner race 11 and is rotatable relative thereto. A self-lubricating bearing material 15 is fixedly secured to the inner bearing surface 17 of the outer race 13, said bearing material 15 being engageable with and movable relative to the outer bearing surface 19 of the inner race 11. An annular closure 21 is secured to the inner race 11 to maintain the outer race 13 fixed with respect to the inner race 11 in the axial direction. Techniques for securing the bearing material 15 to the inner bearing surface 17 of the outer race 13 are known in the art, as disclosed for example in the aforementioned U.S. Pat. No. 4,134,842, the disclosure of which is incorporated herein by reference.

FIG. 1b is a fragmentary section view and FIG. 2 is a section view of the improved bearing assembly of the present invention with the shaft omitted for clarity. As illustrated, the bearing assembly comprises inner race 23 which may, for example, be a bushing. An outer race 25 is so positioned that it is engageable with the inner race 23 and is rotatable relative thereto. An annular locking member 27 prevents axial movement of the outer race 25 with respect to the inner race 23. In the bearing assembly of the present invention, unlike that of the prior art, the outer surface 29 of the inner race 23 is provided with a self-lubricating bearing material 31 fixedly secured thereto, in any conventional manner, as illustrated. The bearing material 31 is engageable with and movable relative to the inner bearing surface 33 of the outer race 25.

Also, in accordance with the present invention, the self-lubricating bearing material 31 is fixedly secured to the side walls 35 of the outer race 25 in order to provide low friction engagement of the outer race 25 with respect to the complimentary and co-engaging surface 37 of annular locking member 27 and the co-engaging surface 39 of the flange portion 41 of the inner race 23.

Figure 3:
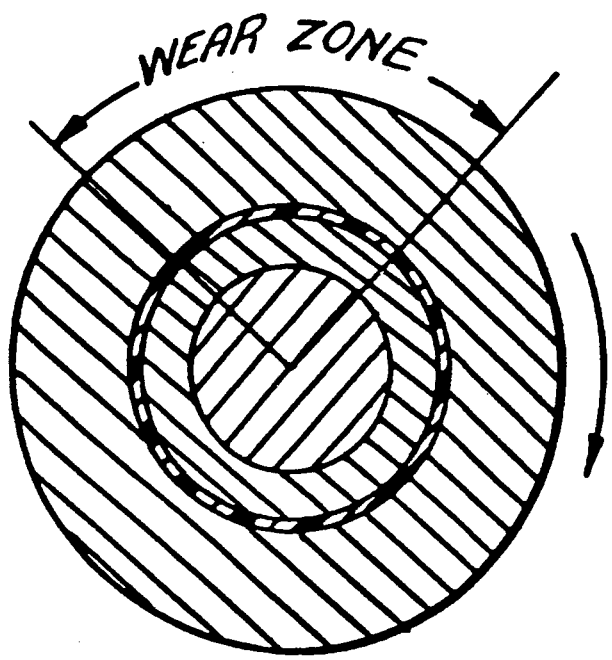
FIG. 3 is view along lines 3—3 of FIG. 2.

FIG. 3 is a section view taken along the lines 3—3 of FIG. 2 and illustrates the relative position of the self-lubricating bearing material 31 secured to outer, arcuate surface 29 of the inner race 23 with respect to the bearing surface 33 of outer race 25. In a typical mode of operation, the applied bearing load is directed vertically as indicated by the arrow, thus causing the bearing surface 33 of the outer race 2S to bear against the self-lubricating bearing material 31 of inner race 23 in the illustrated wear zone. Thus, if the inner race 23 is fixed in position, only the bearing material 31 in the wear zone will be subjected to wear. In keeping with the present invention, the inner race 23 may be indexed to vary the portion of the bearing material 31 subjected to wear, thereby extending the life of the bearing assembly.

The inner race 23 and the outer race 25 of the bearing assembly of the present invention are made of metal, such as titanium and preferably case hardened titanium. Alpha titanium, beta titanium and alpha-beta titanium may also be used. A hard coating on the titanium may be made such as an oxide of titanium which may be achieved by anodizing. The invention also contemplates physical vapor deposition of a coating on the metal race such as titanium nitride. A hardened surface may also be effected by a plasma sprayed chromium carbide which is then polished. Diffusion coating may be employed such as, for example, with a chrome oxide with either the alpha or beta titanium or both. Other metals such as stainless steel (wrought or powder metallurgy) including 440C, 17-4PH and 304, and more preferably 440C, can be used. Other metals such as high carbon steel 52100 as well as anodized aluminum, Inconel and Hastelloy can also be employed, so as to provide a metal inner bearing surface 33. The side walls 35 of the outer race 25 have fixedly secured thereto a self-lubricating material 31.

The inner race 23 of the bearing assembly of the present invention can also be made of a metal such as defined above, and more preferably stainless steel 17-4PH. The outer surface 20 thereof has fixedly secured thereto the self-lubricating material 31.

The self-lubricating material 31 can be a solid organic lubricant such as a solid polyester, polyamide, polyphenylene sulfide, polyarylsulfone, a polyfluorocarbon or, a cured acrylate as disclosed in U.S. Pat. No. 4,048,370 and incorporated herein by reference or even a woven fiber matrix impregnated with a cured acrylate composition as disclosed in U.S. Pat. No. 4,134,842, also incorporated herein by reference. The self-lubricating material 31 can be secured to the outer surface 29 of inner race 23 and to the side walls 35 of the outer race 25 by known methods.

Representative polyesters include aromatic polyesters such as p-oxybenzoyl polyester which is commercially available, for instance, under the tradename Ekanol and sold by the Carborundum Co. This polyester material has a density ranging from 1.44–1.48 gcc and a melting point of about 800° F. Polyamides usefully employed in the present invention include, for instance, Nylon-6 and Nylon-6,6 although it will be recognized that other nylon formulations can also be employed. Aromatic poly p-phenylene sulfides can alo be employed and such polymers can have a molecular weight ranging as high as about 13,000. They are available, commercially, under the tradename of Ryton by Phillips Petroleum Company, such a product having a specific gravity of about 1.34, a density of about 0.0485 lbs/in$^3$ and a melting point of about 550° F. Polyfluorocarbons usefully employed in the present invention include polytetrafluoroethylene. Included in the polyaryl sulfones suitable for use in the present invention are those which have a molecular weight ranging from about 30,000 to 60,000. One convenient polyaryl sulfone is that sold commercially under the tradenane Polymer 360-3M Astrel 360 having a specific gravity of 1.36, a density of 0.049 lbs/in$^3$, a compressive strength at 73° F. of 17,900 psi and a melting point of about 550° F. Polyimides employed in the present invention are aromatic polyimides which are available commercially under, for instance, the tradenames of Vespel SP-1 (DuPont) which has a specific gravity ranging from about 1.41–1.43, a density of about 0.052 lbs/in$^3$, a compressive strength at 73° F. of about 24000 psi and a heat distortion temperature at 264 psi of about 680° F. A modified Vespel SP-1 polyimide is Vepel SP-21 which contains 15 weight percent graphite, has a specific gravity of about 1.51, a density of about 0.0546 lbs/in$^3$ and a compressive strength at 73° F. of about 18,000 psi. Other polyimides include one available commercially as XPl-182 by American Cyanamid which has a specific gravity of about 1.28, a density of about 0.046 lbs/in$^3$, a compressive strength at 73° F. of about 25,000 psi and a heat distortion temperature at 264 psi of about 440° F. Still another polyimide commercially available is that sold under the tradename of Genom 3010 by General Electric and has a specific gravity of about 1.90, a density of about 0.068 lbs/in$^3$, a compressive strength at 73° F. of about 41,900 psi and a heat distortion temperature at 264 psi of about 660° F. Polyimides containing polytetrafluoroethylene or graphite fibers can also be used.

When the self-lubricating material selected is a cured mixture of an acrylate composition and a particulate solid lubricant, such as polytetrafluoroethylene, the acrylate composition can be selected from the group consisting of (a) a mixture of a major amount of a liquid acrylic ester elected from the group consisting of di-, tri-, and tetraesters of an acrylic acid and a polyhydric alcohol, a minor amount of a low molecular weight prepolymer of an ester of a low molecular weight alcohol having a terminal vinyl group and an aromatic polycarboxylic acid in solution in said acrylic ester and an organic amide of the formula

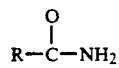

wherein R is elected from the group consisting of hydrogen and aliphatic hydrocarbon of 1-20 carbon atoms in an amount sufficient to copolymerize said acrylic ester and prepolymer, (b) a mixture of acrylic ester monomer, a peroxidic initiator in an amount sufficient to initiate polymerization of said monomer and an aminoalkoxyalkylamine of the formula $R_1=N(H)R_2[OR_3]_xN(H)R_4$ wherein x is an integer of 1-6 inclusive, each of $R_1$ and $R_4$ is selected from the group consisting of hydrogen and lower alkyl and each of $R_2$ and $R_3$ is a lower alkyl linking bridge between N and O, in an amount sufficient to accelerate the polymerization of said monomer, (c) a mixture of an acrylic ester of an alkyl amino alkyl alcohol and an effective amount of hydroperoxide catalyst, said acrylic ester having the formula

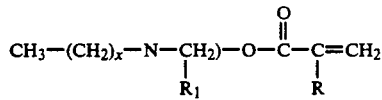

wherein x is an integer of 0-5 inclusive, y is an integer of 1-6 inclusive, R is selected from the group consisting of hydrogen, halogen, hydroxy, cyano and lower alkyl and $R_1$ is selected from the group consisting of hydrogen and alkyl having 1-6 carbon atoms, (d) a mixture of a liquid acrylic ester monomer selected from the group consisting of diesters of an acrylic acid and a polyhydric alcohol, acrylic esters of cyclic ether alcohols, acrylic esters of amino alcohols and mixtures thereof, peroxidic initiator and an oxyalkylamine of the formula $(H)_m=N[(CH_2)_x(OR_1)_yOR_2]_n$ wherein m and n are each integers of 1 to 2 inclusive, the total of m and n is 3, x is an integer of 1 to 6 inclusive, y is an integer of 0 to 6 inclusive, $R_1$ is lower alkyl and $R_2$ is selected from hydrogen and lower alkyl, (e) a mixture of an acrylic ester monomer elected from the group consisting of di-, tri- and tetraesters of an acrylic acid and a polyhydric alcohol, acrylic esters of cyclic ether alcohols, acrylic esters of amino alcohols and mixtures thereof, a peroxidic initiator of an amount sufficient to initiate polymerization of said monomer and a member elected from the group consisting of rhodanine and a hydrazide of the formula

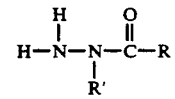

wherein R and R' are selected from separate groups and an interconnected group forming a cyclic ring, R is further selected from the group consisting of hydrogen, alkyl, cycloalkyl, aryl and alkoxy and R' is elected from the group consisting of hydrogen, alkyl, cycloalkyl, acyl and dithiocarbonyl in an amount sufficient to accelerate the polymerization of said monomer; and (f) a mixture of a monomer of the formula

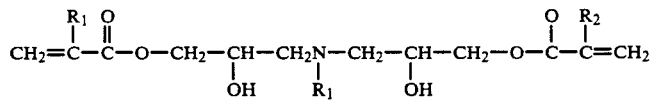

wherein $R_1$ and $R_2$ are selected from the group consisting of hydrogen and lower alkyl and $R_3$ is selected from the group consisting of lower alkyl, lower hydroxyalkyl, cyano and lower cyanoalkyl; at least one equivalent of an acid for each equivalent of said monomer, said acid being selected from the group consisting of acrylic acid and lower alkyl acrylic acids; an initiator elected from the group consisting of t-butyl perbenzoate, t-butyl peracetate and di-t-butyl diperphthalate, said initiator being present in an amount sufficient to initiate the polymerization of said monomer; a trihydroxy benzene inhibitor and an accelerator selected from the group consisting of benzhydrazide and N-aminorhodanine.

When the self-lubricating material selected is a woven fiber matrix impregnated with a cured acrylate composition, the woven fiber matrix can comprise a material woven from a mixture of fibers, one face of the material comprising lubricating fibers, the other comprising reinforcing fibers. Conveniently the woven fiber mmtrix can be fabricated from polytetrafluoroethylene fibers, as the lubricating fibers; and from such reinforcing fibers as KEVLAR fibers, polyethylene terephthalate (DACRON) fibers as well as fiberglass and graphite fibers. Preferably, the reinforcing fibers are KEVLAR fibers, available commercially under the tradename KEVLAR PRD 49, by DuPont. KEVLAR is an organic polymeric compound known as an aromatic polyamide, i.e. an aramid. It is a high strength, high modulus fiber made from long chain synthetic polyamides wherein at least 85 percent of the amide linkages are attached directly to two aromatic rings. KEVLAR fiber is extremely stable, has high strength, toughness and stiffnes characteristics The density of KEVLAR PRD 49 is 1.45 g/cc and its mechanical properties lie between the values of glass and graphite filament. The curable acrylate, which can be any of those defined above at (a) through (f) is present in an amount sufficient to impregnate the woven fiber matrix and to bond the same to the outer surface of the inner race.

What is claimed is:
1. A track-roller bearing assembly comprising:
an inner race member having an outwardly facing arcuate surface;
an outer race member having an inwardly facing arcuate surface, said outer race member being rotatable about said inner race member; and
an annular body of self-lubricating material affixed to one of said arcuate surfaces of said race members to form a self-lubricating bearing surface, wherein the arcuate surface of the other of said race members is a bearing surface made of titanium, said titanium bearing surface slidably engaging said self-lubricating bearing surface.

2. The track-roller bearing assembly of claim 1, wherein the annular body of self-lubricating bearing material is affixed to the inner race member, and wherein the titanium bearing surface is the inwardly facing arcuate surface of the outer race member.

3. The track-roller bearing assembly of claim 2, wherein said titanium bearing surface is made of case hardened titanium.

4. The track-roller bearing assembly of claim 2, wherein said annular body of self-lubricating bearing material is a cured mixture comprising an acrylate composition and a particulate solid lubricant.

5. The track-roller bearing assembly of claim 4, wherein said titanium bearing surface is made of case hardened titanium.

6. The track-roller bearing assembly of claim 4, wherein said acrylate composition is selected from the group consisting of:
(a) a mixture of a major amount of a liquid acrylic ester selected from the group consisting of di-, tri-, and tetraesters of an acrylic acid and a polyhydric alcohol, a minor amount of a low molecular weight prepolymer of an ester of a low molecular weight alcohol having a terminal vinyl group and an aromatic polycarboxylic acid in solution in said acrylic ester and an organic amide of the formula

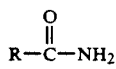

wherein R is selected from the group consisting of hydrogen and aliphatic hydrocarbon of 1-20 carbon atoms in an amount sufficient to copolymerize said acrylic ester and prepolymer, (b) a mixture of acrylic ester monomer, a peroxide initiator in an amount sufficient to initiate polymerization of said monomer and an aminoalkoxyalkylamine of the formula $R_1N(H)R_2[OR_3]_xN(H)R_4$ wherein x is an integer of 1-6 inclusive, each of $R_1$ and $R_4$ is selected from the group consisting of hydrogen and lower alkyl and each of $R_2$ and $R_3$ is a lower alkyl linking bridge between N and 0, in an amount sufficient to accelerate the polymerization of said monomer, (c) a mixture of an acrylic ester of an alkyl amino alkyl alcohol and an effective amount of hyperoxide catalyst, said acrylic ester having the formula

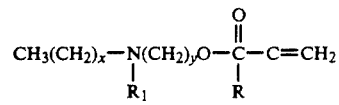

wherein x is an integer of 0-5 inclusive, y is an integer of 1-6 inclusive, R is selected from the group consisting of hydrogen, hologen, hydroxy, cyano and lower alkyl and $R_1$ is selected from the group consisting of hydrogen and alkyl having 1-6 carbon atoms, (d) a mixture of a liquid acrylic ester monomer selected from the group consisting of diesters of an acrylic acid and a polyhydric alcohol, acrylic esters of cyclic ether alcohols, acrylic esters of amino alcohols and mixtures thereof, a peroxide initiator and an oxyalkylamine of the formula $(H)_mN[(cH_2)_x(OR_1)_yOR_2]_n$ wherein m and n are each integers of 1 to 2 inclusive, the total of m and n is 3, x is an integer of 1 to 6 inclusive, y is an integer of 0 to 6 inclusive, $R_1$ is lower alkyl and $R_2$ is selected from hydrogen and lower alkyl, (e) a mixture of an acrylic ester monomer selected from the group consisting of di-, tri- and tetraesters of an acrylic acid and a polyhydric alcohol, acrylic esters of cyclic ether alcohols, acrylic esters of amino alcohols and mixtures thereof, a peroxide initiator of an amount sufficient to initiate polymerization of said monomer and a member selected from the group consisting of rhodanine and a hydrazide of the formula

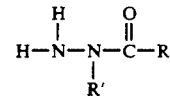

wherein R and R' are selected from separate groups and an interconnected group forming a cyclic ring, R is further selected from the group consisting of hydrogen, alkyl, cycloalkyl, aryl, and alkoxy and R' is selected from the group consisting of hydrogen, alkyl, cycloalkyl, acyl and dithiocarbonyl in an amount sufficient to accelerate the polymerization of said monomer; and (f) a mixture of a monomer of the formula

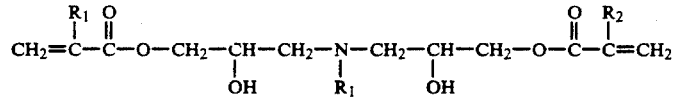

wherein $R_1$ and R are selected from the group consisting of hydrogen and lower alkyl and R is selected from the group consisting of lower alkyl, lower hydroxyalkyl, cyano and lower cyanoalkyl; at least one equivalent of an acid for each equivalent of said monomer, said acid being selected from the group consisting of acrylic acid and lower alkyl acrylic acids; an initiator selected from the group consisting of t-butyl perbenzoate, t-butyl peracetate and di-t-butyl diperphthalate, said initiator being present in an amount sufficient to initiate the polymerization of said monomer; a trihydroxy benzene inhibitor and an accelerator selected from the group consisting of benzhydrazide and N-aminorhodanine.

7. The track-roller bearing assembly of claim 2, wherein said annular body of self-lubricating bearing material is a woven fiber matrix impregnated with a cured acrylate composition.

8. The track-roller bearing assembly of claim 7, wherein said titanium bearing surface is made of case hardened titanium.

9. The track-roller bearing assembly of claim 7, wherein said woven fiber matrix of the annular body has an inner face facing toward the inner race member and an outer face facing toward the inwardly facing titanium bearing surface, the inner face comprising reinforcing fibers, the outer face comprising lubricating fibers.

10. The track-roller bearing assembly of claim 9, wherein said reinforcing fibers are made at least in part from a material selected from the group:
KEVLAR, polyester, fiberglass, and graphite.

11. The track-roller bearing assembly of claim 9, wherein said lubricating fibers are made at least in part from polytetrafluoroethylene.

12. The track-roller bearing assembly of claim 1, wherein said inner race member is connected to a shaft, the shaft having an axis, and wherein said outer race member has an opening through which said shaft extends, the outer race member having an axis extending through said opening, the track-roller bearing assembly further comprising:
a realigning means for exerting pressure to align the axis of the shaft and the axis of the outer race member.

13. The track-roller bearing assembly of claim 12, wherein said outer race member has an inwardly tapered conical end face, and wherein said realigning means comprises a resilient wedge-shaped ring disposed between the conical end face of the outer race member and the shaft of the inner member.

14. The track-roller bearing assembly of claim 13, wherein said titanium bearing surface is made of case hardened titanium.

15. The track-roller bearing assembly of claim 12, wherein said outer race member has an inwardly tapered conical end face, and wherein said inner race member has a cylindrical portion extending outwardly from the opening in the outer race member along the axis of the outer race member, said realigning means comprising a resilient ring disposed between the conical end face of the outer race member and the cylindrical portion of the inner member.

16. The track-roller bearing assembly of claim 15, wherein said titanium bearing surface is made of case hardened titanium.

17. The track-roller bearing assembly of claim 12, wherein said outer race member has an inwardly tapered conical end face, and wherein said inner race member has a wedge-shaped ring portion expanding outwardly from the opening in the outer race member along the axis of the outer race member, said realigning means comprising a resilient washer ring disposed between the conical end face of the outer race member and the wedge-shaped ring portion of the inner member.

18. The track-roller bearing assembly of claim 17, wherein said titanium bearing surface is made of case hardened titanium.

* * * * *